(12) United States Patent
Ozsoylu et al.

(10) Patent No.: US 9,409,559 B2
(45) Date of Patent: Aug. 9, 2016

(54) VEHICLE BRAKING SYSTEM WITH ELECTRIC BRAKE BOOSTER

(71) Applicant: AUTOLIV ASP, INC., Ogden, UT (US)

(72) Inventors: Suat Ozsoylu, Rochester Hills, MI (US); Ron Posa, Commerce Township, MI (US); Michael Yang, Westland, MI (US); Karen Boswell, Freeland, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 13/799,458

(22) Filed: Mar. 13, 2013

(65) Prior Publication Data
US 2014/0265542 A1    Sep. 18, 2014

(51) Int. Cl.
*B60T 13/58* (2006.01)
*B60T 13/14* (2006.01)
*B60T 13/74* (2006.01)
*B60T 8/40* (2006.01)

(52) U.S. Cl.
CPC ............. *B60T 13/586* (2013.01); *B60T 13/142* (2013.01); *B60T 13/745* (2013.01); *B60T 8/4077* (2013.01)

(58) Field of Classification Search
CPC ..... F01B 31/00; B60T 13/745; B60T 13/142; B60T 13/586; B60T 8/4077
USPC ................... 303/3, 10, 15, 151, 152, 113.1; 188/151 R
See application file for complete search history.

(56) References Cited

U.S. PATENT DOCUMENTS

| 6,957,871 B2 * | 10/2005 | Maki | B60L 7/26 303/113.3 |
| 2003/0214180 A1 * | 11/2003 | Kusano | B60T 8/44 303/116.2 |

(Continued)

FOREIGN PATENT DOCUMENTS

DE    102010038548 A1    2/2012
WO       2012019802 A1    2/2012

OTHER PUBLICATIONS

International Search Report regarding International Application No. PCT/US2014/014846, ISA/US dated May 21, 2014.

(Continued)

*Primary Examiner* — Robert A Siconolfi
*Assistant Examiner* — San Aung
(74) *Attorney, Agent, or Firm* — Stephen T. Olson; Harness, Dickey & Pierce, P.L.C.

(57) ABSTRACT

A braking system for a vehicle is operative to apply a friction brake force to at least one wheel of the vehicle. The braking system includes a master cylinder is in fluid communication with a reservoir of brake fluid and in fluid communication with the hydraulic brake device. According to one aspect, the braking system includes an electric brake force generator which moves the brake fluid within the master cylinder to deliver brake fluid to the friction brake device in response to a first predetermined displacement of a brake pedal. The electric brake force generator includes a housing defining a boost chamber filled with brake fluid and in fluid communication with the reservoir of brake fluid and further includes a drive arrangement for creating pressure in the boost chamber. In accordance with another aspect, the braking system includes a mechanical brake force generator is disposed between a brake pedal and a primary piston of the master cylinder which is operative to actuate the master cylinder in response to a predetermined displacement of the brake pedal.

13 Claims, 6 Drawing Sheets

(56) References Cited

U.S. PATENT DOCUMENTS

| | | | |
|---|---|---|---|
| 2008/0257670 A1* | 10/2008 | Drumm | B60T 8/4077 188/358 |
| 2008/0258545 A1* | 10/2008 | Drumm | B60T 8/3275 303/114.1 |
| 2009/0026835 A1* | 1/2009 | Matsubara | B60T 7/12 303/15 |
| 2010/0225159 A1* | 9/2010 | Drumm | B60T 8/4077 303/20 |
| 2011/0115282 A1* | 5/2011 | Dinkel | B60T 7/042 303/3 |
| 2011/0254359 A1 | 10/2011 | Klimes et al. | |
| 2011/0291470 A1* | 12/2011 | Drumm | B60T 1/10 303/3 |
| 2012/0248861 A1* | 10/2012 | Miyata | B60T 8/4275 303/10 |

OTHER PUBLICATIONS

Written Opinion regarding International Application No. PCT/US2014/014846, ISA/US dated May 21, 2014.
U.S. Appl. No. 14/157,709, filed Jan. 17, 2014.
U.S. Appl. No. 13/799,655, filed Mar. 13, 2013.

* cited by examiner

Pedal Feel Characteristics
Representing with Electric Boost

Fig. 8

VEHICLE BRAKING SYSTEM WITH ELECTRIC BRAKE BOOSTER

FIELD

The present disclosure generally relates to vehicle braking systems. More particularly, the present teachings relate to a vehicle braking system with an electric brake booster.

BACKGROUND

This section provides background information related to the present disclosure which is not necessarily prior art.

In a conventional vehicle, kinetic energy is converted into heat through friction braking. For example, when a driver applies a mechanical force to a brake pedal, a master cylinder converts the mechanical force into hydraulic pressure. The hydraulic pressure applies a force to a friction material, such as a brake pad, and forces the friction material against the sides of a disc attached to a wheel. The friction material against the disc creates friction and causes the wheel to slow or stop. Modern vehicles utilize a brake booster to reduce the amount of mechanical force the driver is required to apply to the brake pedal to effectively slow or stop the vehicle. The brake booster uses vacuum from the engine intake to boost the force applied by the brake pedal on the master cylinder.

Electrical vehicles rely solely on an electric propulsion system. Hybrid electric vehicles combine an internal combustion engine with an electric propulsion system. Electric and hybrid electric vehicles do not produce a sufficient source of vacuum pressure for conventional brake booster actuation. Internal combustion, diesel, stratified charge, and spark ignition direct injection engines have higher efficiency and produce less vacuum than typical internal combustion engines. As such, alternative arrangements are employed in these vehicles to boost the force applied to the brake pedal on the master cylinder. For example, electric, hybrid electric, and fuel efficient internal combustion engine vehicles may include electro-mechanical brake boosters.

Hybrid and electric vehicles are generally known to employ regenerative braking to activate a motor, such as a generator, during deceleration of the vehicle. Energy conventionally dissipated as heat during frictional braking can be converted into electrical energy and stored in a battery. In this manner, energy may be conserved for subsequent use thereby extending the electrical range of the vehicle under electrical power. Friction braking may also be blended with regenerative braking by a vehicle ECU to provide the brake force requested by the driver.

While known braking systems have proven to be successful for their intended purposes, a continuous need for improvement in the relevant art remains.

SUMMARY

This section provides a general summary of the disclosure, and is not a comprehensive disclosure of its full scope or all of its features.

In accordance with one particular aspect, the present teachings provide a braking system for a vehicle. The vehicle includes a hydraulic brake device for applying a friction brake force to at least one wheel of the vehicle. The braking system includes a master cylinder and an electric brake force generator. The master cylinder is in fluid communication with a reservoir of brake fluid and in fluid communication with the hydraulic brake device. The electric brake force generator moves the brake fluid within the master cylinder to deliver brake fluid to the friction brake device in response to a first predetermined displacement of a brake pedal. The electric brake force generator includes a housing defining a boost chamber filled with brake fluid and is in fluid communication with the reservoir of brake fluid. The electric brake force generator further includes a drive arrangement for creating pressure in the boost chamber. Pressure in the boost chamber actuates the master cylinder to operate the hydraulic brake device.

In accordance with another particular aspect, the present teachings provide a braking system for a vehicle. The vehicle includes a hydraulic brake device. The braking system includes a master cylinder, a brake pedal and a mechanical brake force generator. The master cylinder is in fluid communication with a reservoir of brake fluid and in fluid communication with the hydraulic brake device. The master cylinder includes at least a primary piston movable therein primarily for forcing brake fluid to the hydraulic brake device. The mechanical brake force generator is disposed between the brake pedal and the primary piston of the master cylinder and is operative to actuate the master cylinder in response to a predetermined displacement of the brake pedal.

In accordance with yet another particular aspect, the present teachings provide a method of braking a vehicle with a braking system. The braking system includes a master cylinder in fluid communication with a reservoir of brake fluid and in fluid communication with a hydraulic brake device. The master cylinder includes at least a primary piston. The method includes generating pressure in a boost chamber in response to a driver input. The boost chamber defines a cavity containing brake fluid. The cavity is in direct fluid communication with the primary piston of the master cylinder. The method further includes actuating the master cylinder to deliver brake fluid to the hydraulic braking device by moving the primary piston with the pressure in the boost chamber.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
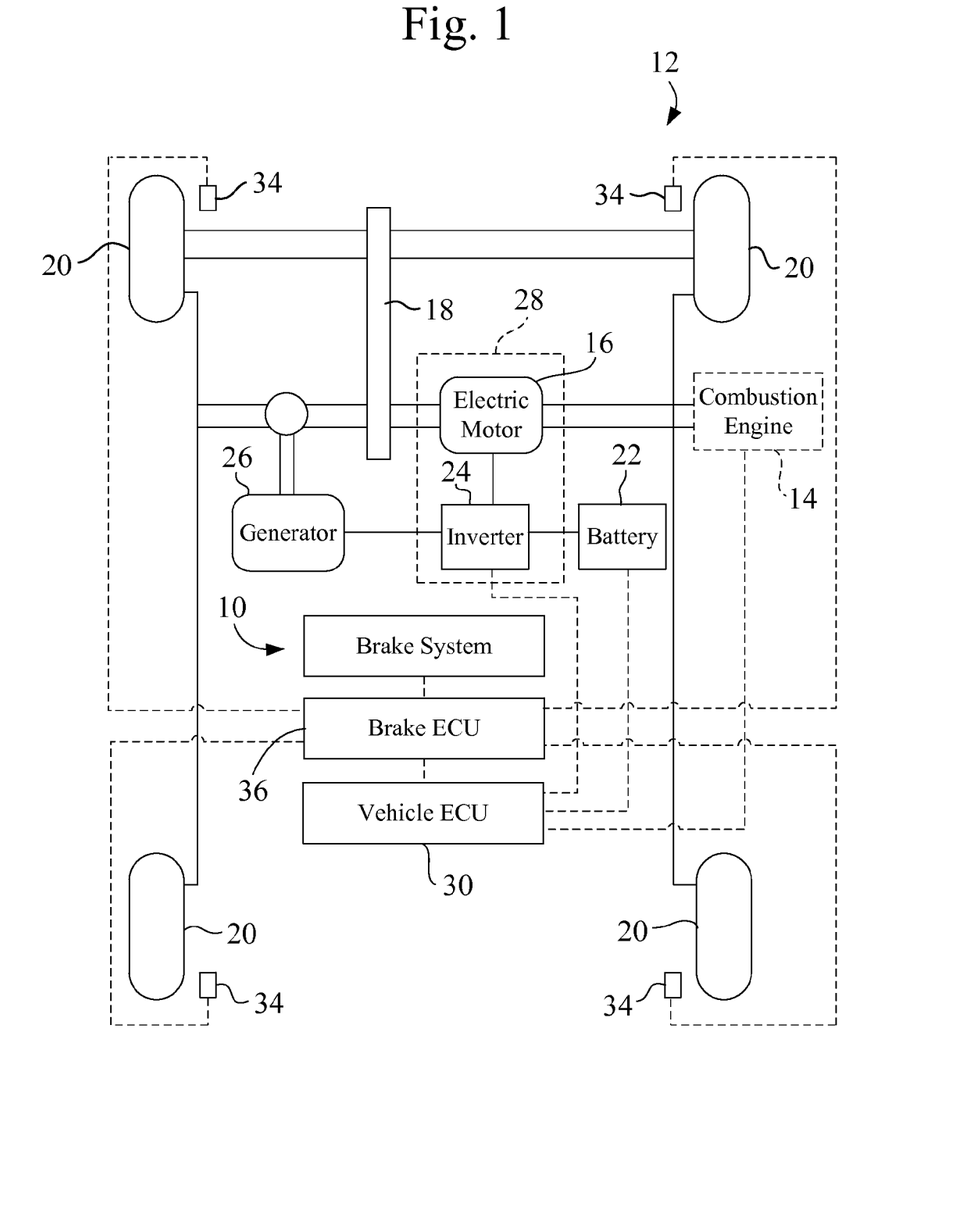
FIG. 1 is a schematic illustration of a vehicle incorporating a braking system in accordance with the present teachings.

With initial reference to FIG. 1, a braking system for a vehicle constructed in accordance with the present teachings is schematically illustrated and generally identified at reference character 10. The braking system 10 is shown operatively incorporated into a motor vehicle 12. Before addressing the details of the braking system 10, a brief description of the exemplary use environment is warranted.

Within the scope of the present teachings, the exemplary vehicle 12 may be an electric vehicle (without internal combustion propulsion) or a hybrid electric vehicle (with internal combustion propulsion). As particularly illustrated, the vehicle 12 is a hybrid electric vehicle having an internal combustion engine 14 and an electric motor 16 for delivering torque to one or more wheels 20 through a transmission 18. In the embodiment illustrated, the internal combustion engine 14 and the electric motor 16 deliver torque to front wheels 20 of the vehicle 12. The electric motor 16 improves fuel economy as compared to conventional internal combustion vehicles.

Electric power for the vehicle 12 is provided by a battery 22. The battery 22 may provide DC electric power. An inverter 24 is electrically connected to the battery 22 to convert the DC voltages to AC voltages for the electric motor 16. The inverter 24 is also electrically connected to a generator 26 for supplying the generator 26 with AC electric power.

The vehicle 12 includes a regenerative braking arrangement 28 for braking and also for converting kinetic energy into electrical energy to charge the battery 22. The regenerative braking arrangement 28 is defined by the electric motor 16 and by the inverter 24. When the driver of the vehicle 12 activates an input (e.g., depresses a brake pedal 29, see FIGS. 3-6), a vehicle Electronic Control Unit (ECU) 30 operates the electric motor 16 in a reverse mode. As such, the electric motor 16 runs backwards and slows the vehicle 12 by application of the resistance of the electric motor 16 through the transmission 18. In this mode, the electric motor 16 functions as a generator of AC electric power. The AC electric power is converted to DC electric power by the inverter 24 and then delivered to the battery 22 for storage.

In addition to the regenerative braking arrangement 28, the vehicle 12 also includes a friction braking arrangement 32 (see FIGS. 3-6). The friction braking arrangement 32 includes friction brakes 34 (e.g., disc brakes) associated with each of the vehicle wheels 20. The friction brakes 34 may be hydraulically controlled with brake fluid. As will be discussed further below, a brake ECU 36 may electrically actuate the friction brakes 34. The friction brakes 34 may also be mechanically actuated independent of electric power in response to a predetermined displacement of the brake pedal 29. During regenerative braking, the vehicle ECU 30 may coordinate a total braking force for the vehicle by blending regenerative braking through the regenerative braking arrangement 28 with friction braking through electrical actuation of the friction brakes 34.

To the extent not otherwise described below, it will be understood that the exemplary use environment for the braking system 10 of the present teachings is conventional in both function and construction.

Figure 2:
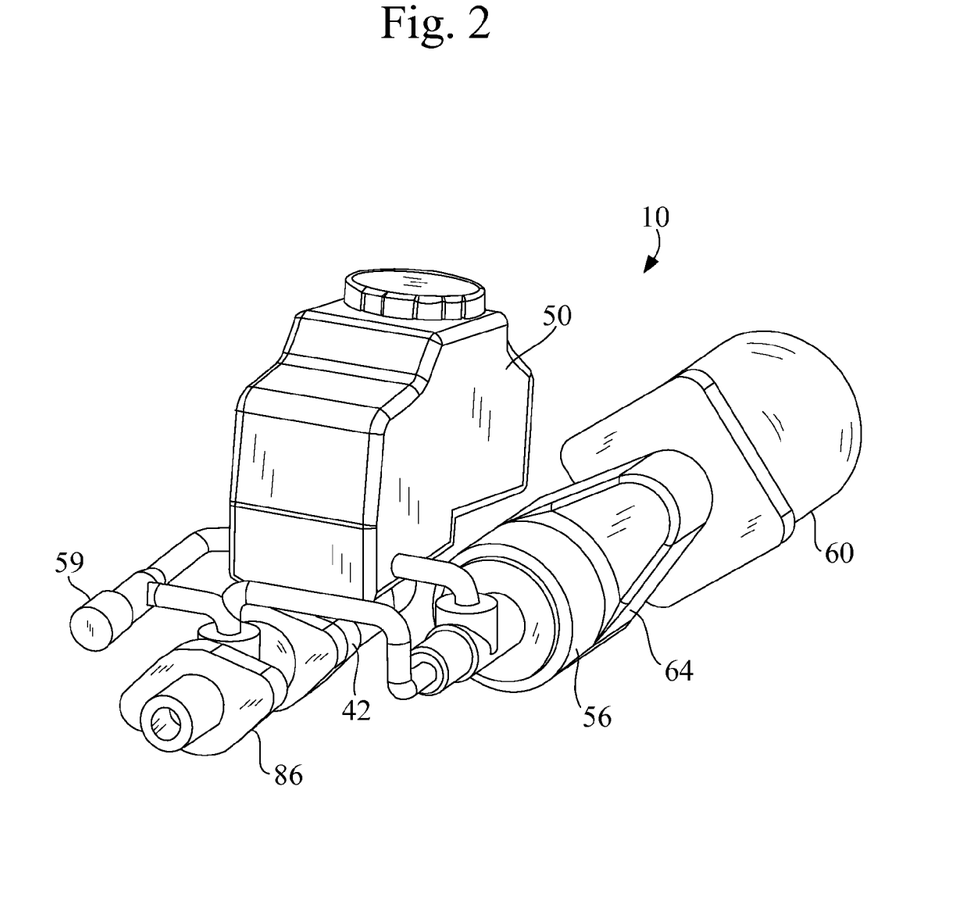
FIG. 2 is a perspective view of a braking assembly in accordance with the present teachings.
Figure 3:
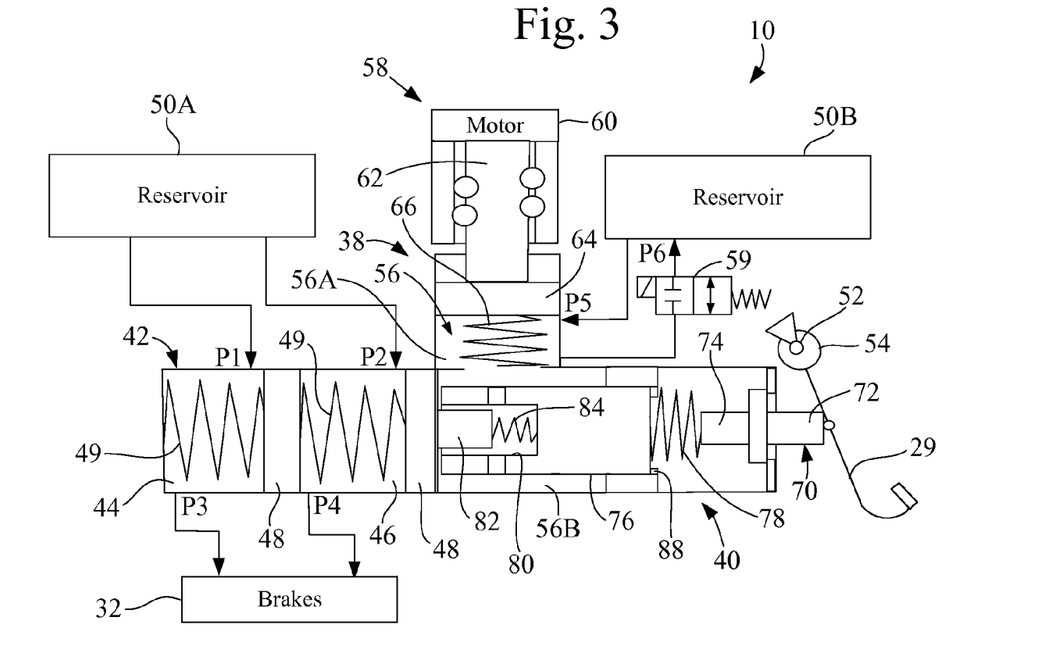
FIG. 3 is a schematic view of a vehicle braking system in accordance with the present teachings, the vehicle braking system shown in a non-braking situation.

With continued reference to FIG. 1, and additional reference to the perspective view of FIG. 2 and the schematic views of FIGS. 3 through 6, the braking system 10 of the present teachings will be further detailed. The braking system 10 is illustrated to generally include an electronic brake force generator 38 and a mechanical brake force generator 40. The electronic and mechanical brake force generators 38 and 40 cooperate with a master cylinder 42 to deliver hydraulic pressure to the friction braking arrangement 32.

The master cylinder 42 is a tandem master cylinder defining first and second chambers 44 and 46, each associated with a piston 48 and a pre-loaded spring 49. The chambers 44 and 46 are filled with brake fluid and are in fluid communication with a reservoir 50A of brake fluid. In the embodiment illustrated, each piston 48 operates a distinct brake circuit. For example, a first of the brake circuits provides for frictional braking at two of the wheels 20 and a second of the brake circuits provides for frictional braking at the other of the two wheels 20. Brake fluid enters the master cylinder 42 through first and second ports P1 and P2 and exits the master cylinder 42 through third and fourth ports P3 and P4.

The brake pedal 29 is mounted inside a passenger compartment of the vehicle 12, and rotates about a pivot axis 52. In the embodiment illustrated, and in response to a driver depressing the brake pedal 29, a pedal travel sensor 54 senses the rotational displacement of the brake pedal 29 about the pivot axis 52. In other embodiments, the pedal travel sensor 54 may sense linear or other displacement of the brake pedal 29. The brake pedal 29 displacement sensed by the pedal travel sensor 54 is electrically communicated to the brake ECU 36.

The electronic brake force generator 38 is illustrated to generally include a boost chamber 56 and an electronic drive arrangement 58. The electronic drive arrangement 58 is operative to actuate the boost chamber 56 to provide a boost to the master cylinder 42. The boost chamber 56 is filled with brake fluid and in fluid communication with a brake fluid reservoir 50B. Brake fluid is delivered from the reservoir 50B through fifth and sixth ports P5 and P6. The schematic views of FIGS. 3 through 6 illustrate the reservoirs 50A and 50B as separate reservoirs. It will be understood, however, that a single reservoir 50 may be employed (as shown in the perspective view of FIG. 2).

In the embodiment illustrated, the electronic brake force generator 38 is illustrated to generally include an electric motor 60 controlled by the brake ECU 36. The electric motor 60 drives an output 62. The output 62 may be coupled to the electric motor 60 through a belt reduction (not shown in the simplified schematic views of FIGS. 3-6) or through a gear reduction or equivalent mechanism. The output 62 may include a nut and spindle, a ball screw assembly or other suitable components. As illustrated, the output 62 includes a ball screw assembly. The output 62 is in contact with an input rod that carries a piston 64 of the boost chamber 56. Because the output 62 is not coupled with the piston 64, the output 62 and piston 64 may lose contact in response to a fast input from the driver and thereby avoid impeding the driver.

The electronic drive arrangement 58 is actuated in response to a sensed displacement of the brake pedal 29 by the pedal travel sensor 54. Upon actuation of the motor 60, the piston 64 is advanced against a spring 66 disposed in a first portion 56A of the boost chamber 56. In this manner, boost pressure builds in the boost chamber 56 and advances the pistons 48 of the master cylinder 42 against the bias of the springs 49. Brake fluid is then forced out third and fourth ports P3 and P4 to deliver hydraulic pressure to the friction braking arrangement 32.

The mechanical brake force generator 40 includes a driver input rod 70 and an intermediate member or driver rod 76. The intermediate member 76 interconnects the brake pedal 29 and the primary piston 48 of the master cylinder 42. As shown, the intermediate member 76 is connected to the brake pedal 29 through the driver input rod 70. The driver input rod 70 has a first end 72 in engagement with the brake pedal 29. A second end 74 is interconnected to a spring 78. Spring 78 may be linear or non-linear. Spring 78 connects the driver input rod 70 to the intermediate member or driver rod 76. The driver rod 76 is preloaded against a shoulder or travel stop 88. The preload is established in relation to the spring 78 stiffness and displacement such that a dead band or gap may exist between the driver input and actuation of the master cylinder 42. The dead band or gap allows the driver to press the brake pedal 29 for a small displacement without actuating the master cylinder 42. In this manner a window for regenerative braking is provided. The vehicle ECU 30 and brake ECU 36 may cooperate with the mechanical brake force generator 40 such that the window for regenerative braking is set for braking maneuvers below 0.3 g's. For vehicle applications without regenerative braking, the differential spring 78 may be removed and rods 70 and 76 may be connected.

The driver rod 76 is disposed in the second portion 56B of the boost chamber 56. In the manner discussed more fully below, the driver rod 76 is movable within the second portion 56B of the boost chamber 56 for actuating the master cylinder 42 in response to sufficient driver input to the brake pedal 29. The driver rod 76 defines a cavity 80 which positions a spring 84. Spring 84 is provided in the cavity 80 to bias the driver rod 76 toward the travel stop 88 The spring preloaded force of the spring 84 is greater than the spring preloaded force of the spring 78. Furthermore, the spring preloaded force of the spring 84 is less than the resistance of the master cylinder 42 opposing translation of the pistons 48. Driver input to the brake pedal 29 may be mechanically pushed through the boost chamber 56 to actuate the master cylinder 42 as the driver input rod 70 contacts the driver rod 76 which contacts primary piston 48. No mechanical linkage from the electronic brake force generator limits the driver pedal travel to move the primary piston.

The mechanical brake force generator 40 may further include pedal feel simulator 86 for providing the driver with feedback from the braking system 10 in the form of resistance to pedal displacement as the brake pedal 29 is depressed. The function of the pedal feel simulator 86 is to allow the driver to close the loop on pedal position to naturally apply the brakes. Feedback to the driver is a combination of simulated feedback and pressure feedback from the master cylinder 42. The feedback is transmitted to the driver through the driver rod 70.

Simulated feedback is developed with the differential springs 78 and 84 positioned between the driver and the master cylinder 42. Springs to ground (not shown) may be used in parallel to the differential springs 78 and 84. Dampers (not shown) may be used in conjunction with the springs 78 and 84. Non-linear springs may be used to improve driver feel. The simulated feedback through the springs and dampers provides feedback to the driver when no master cylinder pressure is developed such as during regenerative braking or when master cylinder pressure is below a predetermined braking pressure (e.g., 0.3 g).

The diameter of the driver rod 70 is established to provide a proportion of the boost chamber pressure to the driver. The spring 78 provides force feedback to the driver in relation to the gap between the driver and the primary piston 48 of the master cylinder 42. The driver rod forces are felt directly by the driver when the driver input has exceeded a predetermined input displacement (e.g., 0.3 g).

The pedal feel simulator 86 of the present teachings allows boost pressure feedback to be delivered to the driver without the use of accumulators or valving. The pressure feedback is directly related to the master cylinder pressure.

A non-braking situation of the braking system 10 is illustrated in FIG. 2. In this situation, the ports P1-P5 are open. The solenoid 59 is electronically open such that the sixth port P6 is closed to the flow. The sixth port P6 is closed to flow unless there is a special case such as a failure state in which the electronic drive arrangement 58 is unable to retract the piston 64 to open the fifth port P5.

Figure 5:
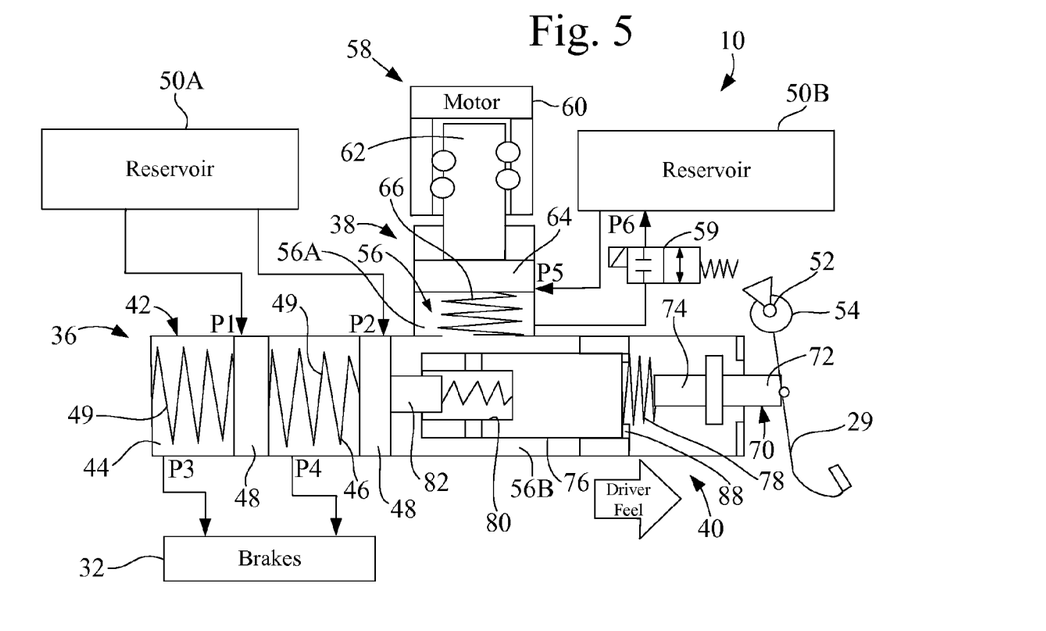
FIG. 5 is another schematic view similar to FIG. 3, the vehicle braking system of FIG. 3 illustrated in a second mode of operation in which vehicle braking is done with both regenerative braking and friction braking.
Figure 6:
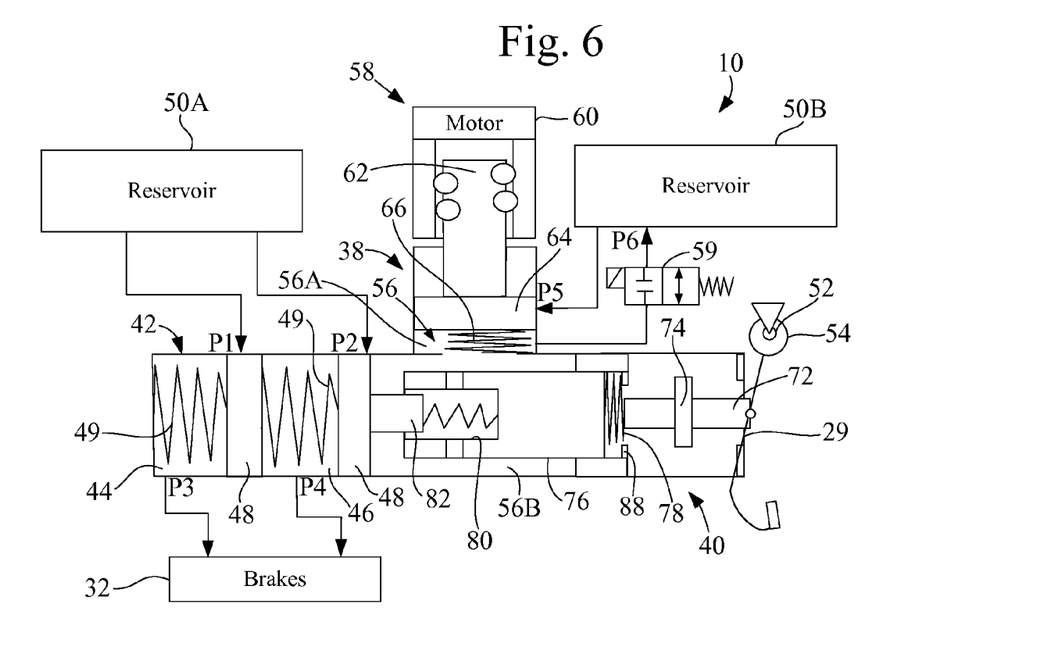
FIG. 6 is another schematic view similar to FIG. 3, the vehicle braking system of FIG. 3 illustrated in a third mode of operation in which vehicle braking is done with friction braking only.

The braking system 10 is operative in a first mode (shown in FIG. 4), a second mode (shown in FIG. 5), and a third mode (shown in FIG. 6). The second mode may be a cooperative regeneration mode in which the vehicle ECU 30 and the brake ECU 36 cooperative to blend regenerative braking by the regenerative braking arrangement 28 with frictional braking by the electronic brake force generator 38 to brake the vehicle 12. The third mode may be an out of regeneration mode where braking of the vehicle is provided by the mechanical brake force generator 40, alone or in cooperation with the electronic brake force generator 38. In this regard, the mechanical brake force generator 40 may independently operate to brake the vehicle in the event that the electronic brake force generator 38 is not powered or otherwise does not sufficiently slow or stop the vehicle 12.

Figure 4:
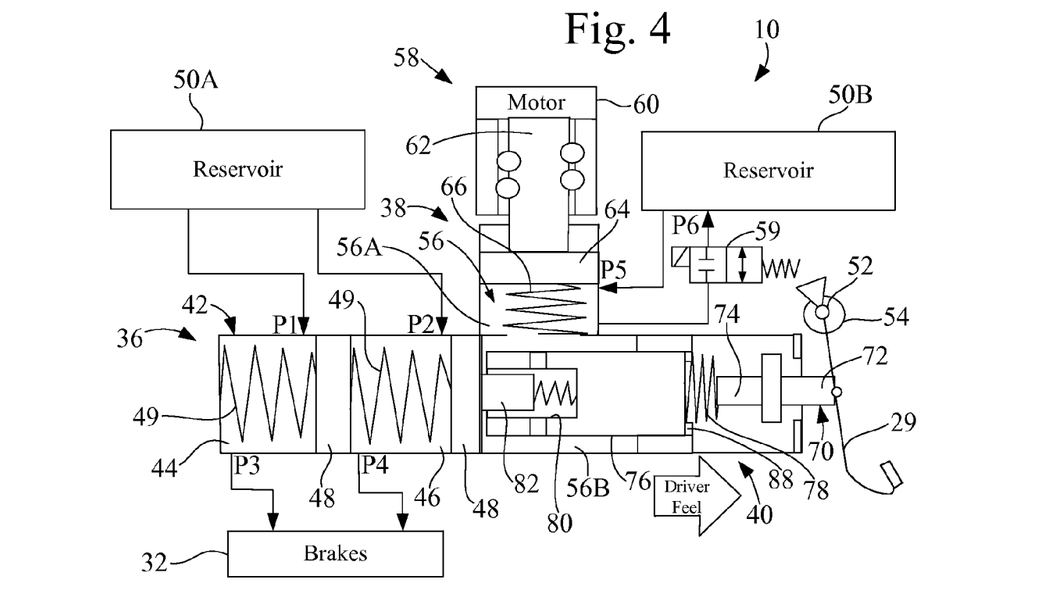
FIG. 4 is a schematic view similar to FIG. 3, the vehicle braking system of FIG. 3 illustrated in a first mode of operation in which vehicle braking is done with regenerative braking only.

With particularly reference to FIG. 4, the braking system 10 is shown operating in the first mode in response to initial displacement of the brake pedal 29 by the driver. The braking system 10 operates within this first mode such that braking is completely with regenerative braking. In this regard, the electric motor 16 is driven backwards and the drag of the electric motor slows or stops the vehicle 12. Electricity is generated by the braking system 10 and routed to the battery 22 for storage through the inverter 24.

The vehicle ECU 30 and brake ECU 36 may cooperate with the mechanical brake force generator 40 such that the window for 100% regenerative braking is set for braking maneuvers below 0.3 g's. In this first mode, all ports P1-P5 remain open. Thus, no brake fluid is forced to the friction braking arrangement 32 and there is no friction braking. The driver vehicle deceleration request is determined from the pedal travel sensor. A pedal force sensor may also be utilized. The signals from the driver pedal travel sensor and the possible pedal force sensor are read by the brake ECU 36. The brake ECU 36 will communicate driver vehicle deceleration request to the vehicle ECU 30.

During the first mode of operation, driver feedback is provided by the spring 78. The spring 78 is compressed against the intermediate element 76. Because the spring force of the spring 78 is less than the spring force of the spring 84, the driver rod 76 remains biased toward the driver input rod 70. Translation of the driver rod 76 in this direction is limited by the travel stop 88.

With particularly reference to FIG. 5, the braking system 10 is shown operating in the second mode in response to further required braking of the vehicle 12. Due to the further braking need, the brake pedal 29 is further displaced by the driver. The braking system 10 operates within this second mode such that braking is a blend of regenerative braking and friction braking from the electric boost provided by the electronic brake force generator 38. The vehicle ECU 30 and the brake ECU 36 cooperate to determine the particular blend of regenerative braking and friction braking. At the start of braking, friction breaking may be utilized and ramped out as the regenerative braking is able to sufficiently slow the vehicle. Similarly, friction braking may be ramped in at the end of braking when regenerative braking is no longer efficient. The electric motor 16 continues to operate in a regenerative way to route electricity to the battery 22 through the inverter 24.

In response to vehicle friction brake request, the brake ECU 36 controls the motor 60 to advance the piston 64 and thereby pressurize the boost chamber 56. The piston 64 moves against the bias of the spring 66. The piston 64 closes the fifth port P5 and a solenoid valve 59 prevents brake fluid from returning to the reservoir 50 via the sixth port P6.

Pressure builds with both the first and second portions 56A and 56B of the boost chamber 56. Electric boost is thereby provided to shift the pistons 48 of the master cylinder 42 to thereby move brake fluid therein and close the first and second ports P1 and P2. Brake fluid is resultantly forced from the third and fourth port P3 and P4 to actuate the friction braking arrangement 32.

During the second mode of operation, driver feedback is provided by the spring 78 and by the spring 84. The spring 78 is further compressed against the intermediate element 76. Feedback to the driver is a combination of simulated feedback and pressure feedback from the master cylinder 42 by means of the pressure on driver rod 76.

With particularly reference to FIG. 6, the braking system 10 is shown operating in the third mode in response to still yet further required braking of the vehicle 12. Further braking may be required in response to aggressive vehicle deceleration needs by the driver. Due to the further braking need, the brake pedal 29 is still further displaced by the driver. The braking system 10 operates within this third mode without regenerative braking. Mechanical force from driver input may be pushed through the boost chamber 56 independent of whether friction braking is being applied from the electronic brake force generator 38.

In this third mode of operation, the manual input supplied by the driver through the brake pedal 29 overcomes the spring force of the spring 84. In this regard, the manual input of the driver linearly translates the intermediate member 76. When the driver rod 76 contacts the primary piston 48, the manual input supplied by the driver is transmitted to the master cylinder 42 to move the pistons 48 and thereby force brake fluid through the third and fourth ports P3 and P4 to actuate the friction braking arrangement 32. As illustrated, the pistons 48 close the first and second ports P1 and P2. The fifth port P5 is closed by the piston 64 and the solenoid valve 59 prevents brake fluid from returning to the reservoir 50 through the sixth port P6.

As discussed above, flow through the sixth port P6 is controlled by the solenoid valve 59. The solenoid valve 59 allows the braking system 10 to reach a fail-safe state even with a failure of the electric boost. Under normal operation, the solenoid 59 prevents backflow from the boost chamber 56 upon manually application through the mechanical brake force generator 40. During a fault condition where port P5 remains closed, P6 will be powered to allow pressure in the boost chambers 56 and 56B to be released to the reservoir. In this state the driver force will directly be applied to the master cylinder 42 without the impedance from pressure on driver rod 76. In certain applications, the solenoid valve 59 may be eliminated if spring 66 guarantees reduced pressure in boost chambers 56 and 56B.

Figure 7:
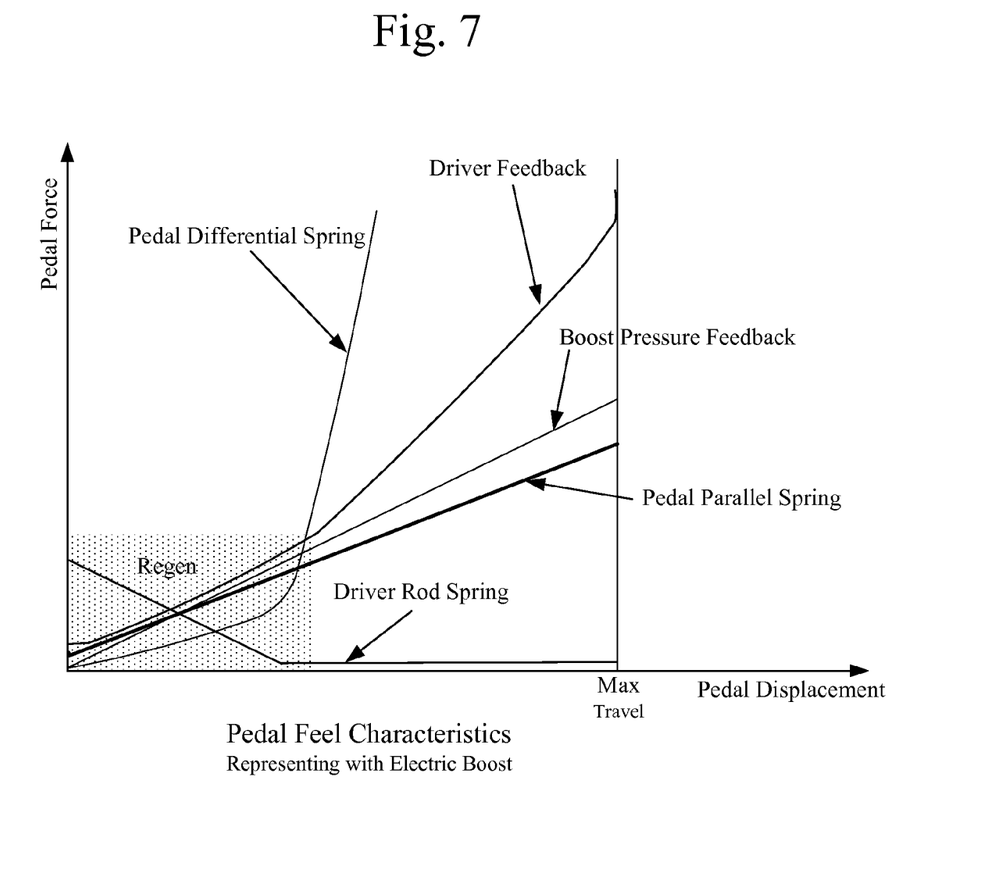
FIG. 7 is a graph illustrating pedal feel characteristic of the vehicle braking system in accordance with the present teachings.

Turning now to FIG. 7, a graph illustrating pedal feel characteristic of the vehicle braking system in accordance with the present teachings.

Figure 8:
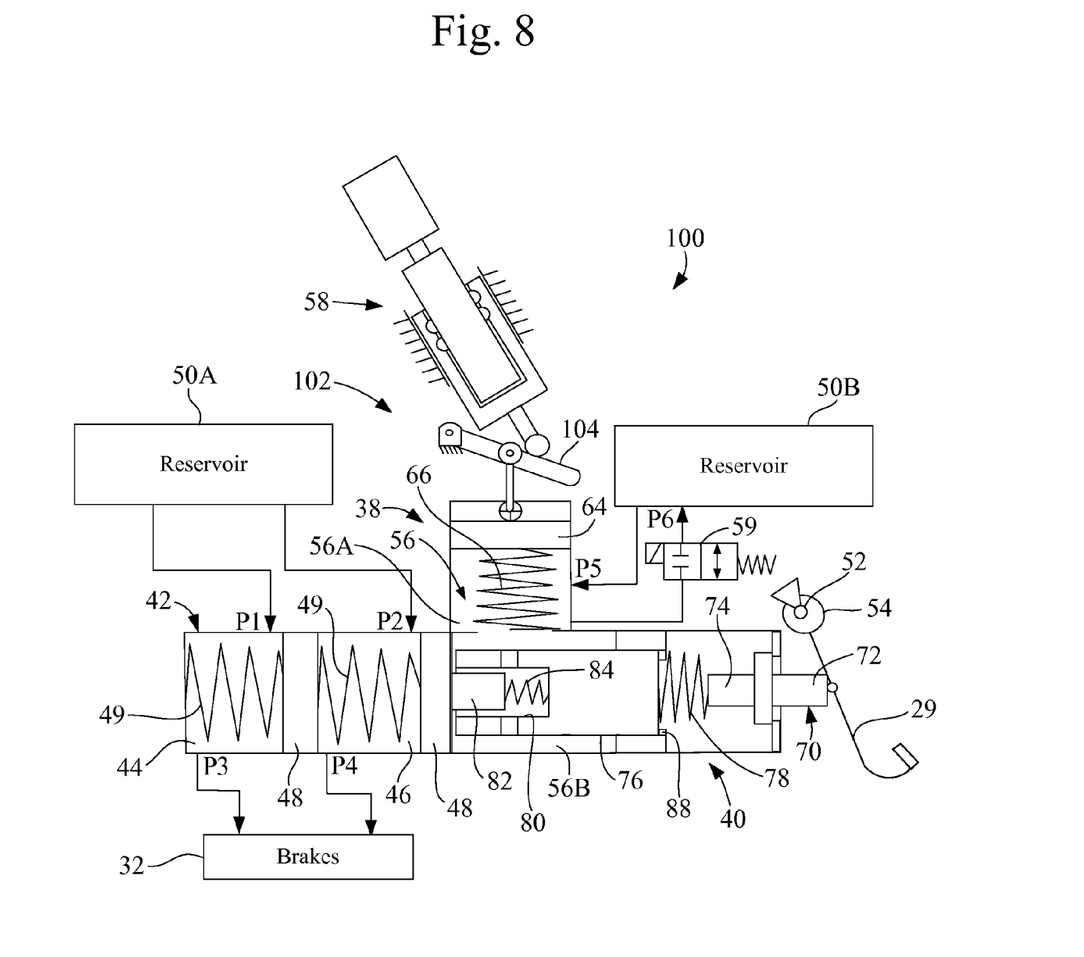
FIG. 8 is a schematic view similar to FIG. 3 illustrating another vehicle braking system in accordance with the present teaching.

With reference to FIG. 8 another braking system in accordance with the present teachings is illustrated and generally identified at reference chamber 100. Similar reference characters are used to identify similar elements discussed above with respect to the braking system 10. In the brake system 10 described above, the linkage between the electronic drive arrangement 58 and the piston 64 is linear. In certain alternative applications, it may be desirable to incorporate a non-linear linkage 102. For example, the output of the electronic drive arrangement 58 may rotate a cantilevered arm 104 which in turn drives the piston 64. A non-linear linkage may allow for a reduction in motor sizing.

For applications that do not include regenerative braking, it may be desirable to eliminate the dead band or gap between the driver input and actuation of the master cylinder 42. The resulting system provides an electric booster that will retain the boost function described above and the ability to develop brake pressure without driver input to the pedal. With the gap removed, brake pressure will be developed with brake pedal input. This variant of the present teachings will find particular application with fuel efficient combustion engines having a reduced vacuum.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A braking system for a vehicle, the vehicle including a hydraulic brake device for applying a friction brake force to at least one wheel of the vehicle, the braking system comprising:
   a master cylinder in fluid communication with a reservoir of brake fluid and in fluid communication with the hydraulic brake device, the master cylinder including at least one master cylinder piston displaceable to operate the hydraulic brake device;
   a boost chamber filled with brake fluid, the boost chamber separated from fluid communication with the master cylinder;
   an electric brake force generator including an output member carrying an electric brake force generator piston disposed in the boost chamber, the electric brake force generator piston displaceable in response to a sensed displacement of a brake pedal to compress brake fluid in the boost chamber and thereby displace the master cylinder piston; and a mechanical brake force generator including a driver input rod and further including an intermediate member disposed in the boost chamber and to drive the at least one master cylinder piston;

a brake pedal sensor; and wherein the brake pedal mechanically coupled to the driver input rod, the brake pedal moveable through an initial range of motion to displace the driver input rod without displacing the intermediate member and moveable through a further range of motion to displace the intermediate member with further displacement of the driver input rod; and wherein the electric brake force generator is electronically controlled by the brake pedal sensor to displace the electric brake force generator upon movement of the brake pedal through the further range of motion; and wherein the intermediate member and the electric brake force generator piston are in direct fluid communication such that the electric brake force generator pressurizes fluid within the boost chamber.

2. The braking system of claim 1, wherein the master cylinder includes at least a primary piston movable therein to force brake fluid to the hydraulic brake device, the primary piston being in fluid communication with the boost chamber.

3. The braking system of claim 2, where the primary piston includes a first side in contact with the brake fluid in the boost chamber.

4. A braking system for a vehicle, the vehicle having a hydraulic brake device, the braking system comprising:

a master cylinder in fluid communication with a reservoir of brake fluid through a first input port and in fluid communication with a hydraulic brake device, the master cylinder including at least a primary piston movable therein for closing the first input port and forcing brake fluid to the hydraulic brake device;

a boost chamber filled with brake fluid, the boost chamber separated from fluid communication with the master cylinder;

a brake pedal;

a mechanical brake force generator disposed between the brake pedal and the primary piston of the master cylinder, the mechanical brake force generator operative to actuate the master cylinder in response to a predetermined displacement of the brake pedal; and a driver input rod movable in response to driver displacement of the brake pedal; and an intermediate member disposed in the boost chamber and movable in response to driver input to drive a piston of the master cylinder, the intermediate member connected to the driver input rod through a first spring and connected to the piston through a second spring, an electric brake force generator including an output member carrying an electric brake force generator piston disposed in the boost chamber, the electric brake force generator piston displaceable in response to a sensed displacement of the brake pedal to compress brake fluid in the boost chamber and thereby displace the master cylinder piston, the electric brake force generator piston and the intermediate member are in direct fluid communication.

5. The braking system of claim 4, wherein the intermediate member interconnects the brake pedal and the primary piston of the master cylinder.

6. The braking system of claim 5, wherein the intermediate member is interconnected to the primary piston of the master cylinder by a biasing member.

7. The braking system of claim 5, wherein the intermediate member is interconnected to the brake pedal by a first biasing member and interconnected to the primary piston of the master cylinder by a second biasing member.

8. The braking system of claim 5, wherein the brake pedal is indirectly connected to the intermediate member through a driver rod.

9. The braking system of claim 7, wherein the master cylinder has a resistance and wherein a biasing force of the first biasing member is less than the mechanical brake force generator defining a dead band during which the brake pedal is depressed while actuating the master cylinder.

10. The braking system of claim 7, wherein the intermediate member defines a chamber, the second biasing member disposed in the chamber and a piston rod coupled to the primary piston of the master cylinder extending into the chamber.

11. The braking system of claim 1, wherein the at least one master cylinder piston is movable to close an input port normally providing fluid communication between the reservoir of brake fluid and the master cylinder.

12. The braking system of claim 1, wherein the at least one master cylinder piston includes a primary and a secondary piston respectively movable to close first and second input ports that normally provide fluid communication between the master cylinder and the reservoir of brake fluid.

13. The braking system of claim 4, further comprising a secondary piston disposed in the master cylinder and a second input port providing fluid communication between the reserve of brake fluid and the master cylinder, the second piston movable to close the second input port.

\* \* \* \* \*